United States Patent Office 3,136,781
Patented June 9, 1964

3,136,781
FLUOROALKYL-THIIRANE COMPOUNDS AND
THEIR PREPARATION
William J. Middleton, Wilmington, Del., assignor to E. I.
du Pont de Nemours and Company, Wilmington, Del.,
a corporation of Delaware
No Drawing. Filed Apr. 14, 1961, Ser. No. 102,952
13 Claims. (Cl. 260—327)

This invention relates to new heterocyclic compounds having a ring sulfur atom and fluorine-containing substituents. More particularly, it relates to certain fluoroalkyl-substituted thiiranes and to their preparation.

Few examples are known of thiiranes, that is, compounds containing the three-membered heterocyclic structure

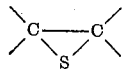

No thiiranes having polyfluoroalkyl substituents have been described, in spite of the ever-increasing scientific and technical interest in fluorine-containing organic compounds.

The new compounds made available by this invention are the substituted thiiranes represented by the general formula (I)
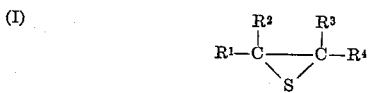

in which from two to four of the R groups are polyfluoroalkyl radicals of the class of perfluoroalkyl, ω-chloroperfluoroalkyl and ω-hydroperfluoroalkyl, and any remaining R groups are hydrogen, fluorine, chlorine, hydrocarbyl or alkoxycarbonyl, with the proviso that when $R^1$ and $R^4$ are polyfluoroalkyl, $R^2$ and $R^3$ are both polyfluoroalkyl, fluorine or chlorine, and that when $R^1$ and $R^2$ are polyfluoroalkyl, $R^3$ and $R^4$ are polyfluoroalkyl, hydrogen, hydrocarbyl or alkoxycarbonyl and not more than one of $R^3$ and $R^4$ is alkoxycarbonyl.

The terms used above have their normal significance, i.e., a perfluoroalkyl radical is an alkyl radical containing only carbon and fluorine atoms, and an ω-chloroperfluoroalkyl or ω-hydroperfluoroalkyl radical is an alkyl radical containing only carbon and fluorine atoms and one chlorine or hydrogen atom, this chlorine or hydrogen atom being at the end of the chain. For the sake of brevity, the compounds of the invention will be referred to as fluoroalkylthiiranes.

These compounds are prepared by one or the other of the following processes:

(A) The compounds of Formula I where the $R^1$ and $R^4$ substituents are both polyfluoroalkyl (i.e., perfluoroalkyl, ω-chloroperfluoroalkyl or ω-hydroperfluoroalkyl) and the other two substituents are both polyfluoroalkyl as defined, fluorine or chlorine, are prepared by a pyrolysis process which comprises heating at a temperature of at least 300° C. a 1,1-dioxo-1,3-dithietane of the general formula (II)
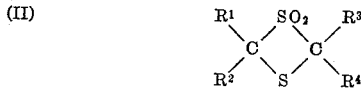

wherein $R^1$ and $R^4$ are both polyfluoroalkyl as defined and $R^2$ and $R^3$ are both polyfluoroalkyl, fluorine or chlorine. This pyrolysis process forms the correspondingly substituted thiirane with liberation of sulfur dioxide, in accordance with the equation

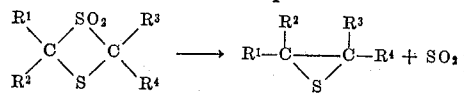

(B) The compounds of Formula I where $R^1$ and $R^2$ are polyfluoroalkyl radicals as defined and $R^3$ and $R^4$ are hydrogen, hydrocarbyl (alkyl, aryl, alkaryl) or alkoxycarbonyl (—COO-alkyl) are prepared by reacting a di(polyfluoroalkyl)thioketone,

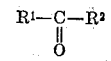

with a diazo compound

which may be a diazohydrocarbon ($R^3$ and $R^4$ being hydrogen, alkyl, aryl or alkaryl), or an α-diazoester ($R^3$ being hydrogen or hydrocarbon as above and $R^4$ being alkoxycarbonyl, i.e., —COOR⁵ where $R^5$ is alkyl). This reaction may be represented by the following equation:

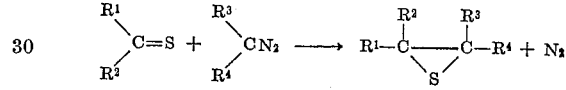

To illustrate, when the diazo compound is diphenyldiazomethane, the resulting thiirane is

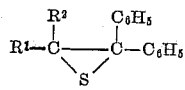

and when it is ethyl diazoacetate, the resulting thiirane is

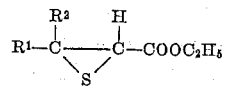

The polyfluorinated starting materials for use in process (A) or (B) are, for the most part, themselves new compounds whose synthesis is described in several copending U.S. patent applications assigned to the assignee of the present application.

In process (A), the starting materials are the polyfluoroalkyl-substituted 1,1 - dioxo-1,3 - dithietanes corresponding to Formula II above. These cyclic sulfide-sulfones are fully described and claimed in the copending U.S. application of Rudolph A. Carboni and James C. Kauer, Serial No. 45,305, filed July 26, 1960, now U.S. Patent 3,058,993. In brief, the cyclic sulfide-sulfones are prepared by oxidation with a mixture of chromium trioxide and yellow fuming nitric acid (nitric acid of specific gravity $d_4^{20}$ about 1.46–1.51) of the corresponding polyfluoroalkyl-substituted 1,3-dithietanes of formula

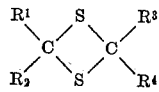

whereby only one of the intracyclic sulfur atoms is converted to a sulfone group. Preferably, there is used from 1.25 to 6 moles of chromium trioxide per mole of 1,3-dithietane; the nitric acid is used in a molar ratio (as $HNO_3$) between 4:1 and 10:1 with respect to the chromium trioxide; and the reaction temperature is in the range of 20–150° C. The resulting cyclic sulfone is separated from the reaction mixture by pouring the latter into water, which dissolves the inorganic materials but not the sulfone.

The suitable 1,3-dithietanes include the following classes of compounds:

(1) The 2,4-bis(perfluoroalkyl, ω-chloroperfluoroalkyl, or ω-hydroperfluoroalkyl)-2,4-dichloro-1,3-dithietanes. These componds, which are dimers of fluorothioacyl chlorides, are fully described and claimed in my copending U.S. application Serial No. 833,913, filed August 17, 1959. They are prepared by ultraviolet light irradiation, preferably in a chlorofluorocarbon solvent, of the fluorothioacyl chlorides of the formula

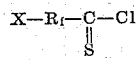

where X is fluorine, chlorine or hydrogen, and $R_f$ is a perfluoroalkylene radical. The fluorothioacyl chlorides themselves may be prepared by reaction with the vapors of boiling sulfur of a fluorochloroalkane $X-R_f-CCl_3$ or of a chlorofluoroalkylmercury compound $$(X-R_f-CCl_2)_2Hg$$

where X and $R_f$ have the previously indicated significance.

Examples of 1,3-dithietanes of this class are

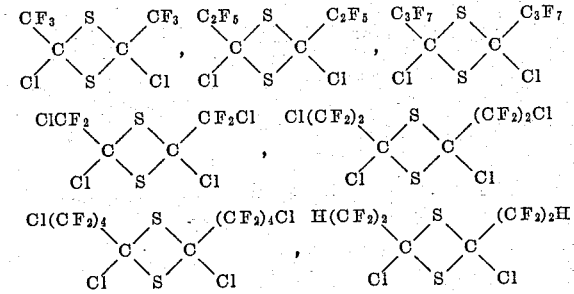

and

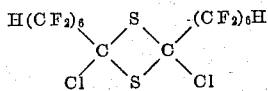

(2) The 2,4-bis(perfluoroalkyl, ω-chloroperfluoroalkyl, or ω-hydroperfluoroalkyl)-2,4-difluoro-1,3-dithietanes. These compounds, which are fully described and claimed in my copending U.S. application Serial No. 833,992, filed August 17, 1959, are prepared by ultraviolet light irradiation, preferably in a perhalocarbon solvent, of the perfluoro-, ω-chloroperfluoro- or ω-hydroperfluorothioacyl fluorides. The latter may be prepared by fluorination with antimony trifluoride of the fluorothioacyl chlorides mentioned under (1) above.

Examples of 1,3-dithietanes of this class are:

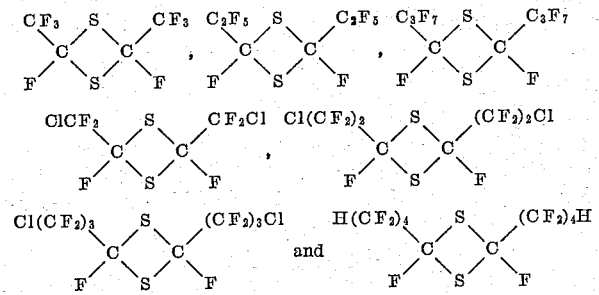

(3) The tetrakis(perfluoroalkyl, ω-chloroperfluoroalkyl, or ω-hydroperfluoroalkyl)-1,3-dithietanes. These compounds are either described in the literature or can be prepared by spontaneous dimerization, preferably in the presence of a Lewis base such as dimethylformamide or a hydrocarbon ether, of the corresponding di(polyfluoroalkyl)thioketones as described and claimed in my copending U.S. application Serial No. 791,860, filed February 9, 1959, now U.S. Patent 3,069,396. The latter, which are fully described and claimed in my copending joint U.S. application with Edward G. Howard, Serial No. 791,857, filed February 9, 1959, now U.S. Patent 3,970,173, can be prepared by heating di(polyfluoroalkyl)ketones with phosphorus pentasulfide at 200–300° C. They may also be prepared by reacting molten sulfur at 400–650° C. with a polyfluoroolefin of at least three carbon atoms in accordance with the equation

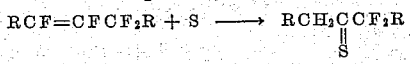

or by reacting hot phosphorus pentasulfide with a secondary polyfluoroalkyl iodide of at least three carbon atoms in accordance with the equation

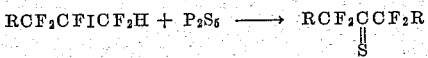

($-CF_2R$ in these equations being perfluoroalkyl, ω-chloroperfluoroalkyl or ω-hydroperfluoroalkyl).

Examples of 1,3-dithietanes of this class are:

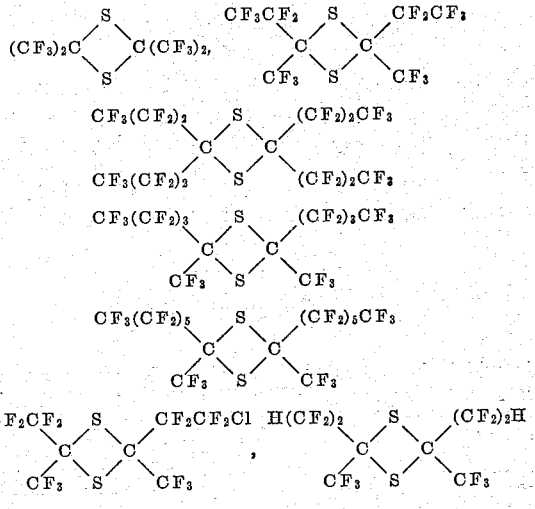

and

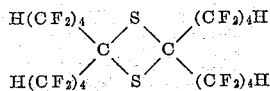

Oxidation of the 1,3-dithietanes of classes (1), (2) and (3) by the method described above leads to the corresponding 1,1-dioxo-1,3-dithietanes, that is, to the compounds exemplified by the formulas shown for each of these classes, except that one of the sulfur atoms is replaced by a sulfone group ($-SO_2-$). The preferred polyfluoroalkyl-substituted 1,1-dioxo-1,3-dithietanes for use as starting materials in process (A) of the present invention are those in which the polyfluoroalkyl (i.e., perfluoroalkyl, ω-chloroperfluoroalkyl and ω-hydroperfluoroalkyl) substituents have from 1 to 6 carbon atoms.

In this process, the fluoroalkylthiirane is prepared by subjecting the chosen polyfluoroalkyl 1,1-dioxo-1,3-dithietane (Formula II above) to a temperature sufficient to effect pyrolysis with concomitant removal of sulfur dioxide from the molecule. This pyrolytic decomposition begins to take place at about 300° C. and proceeds in very good yields at 500–600° C. with shorter contact times. Higher temperatures can be used but it is in general undesirable to exceed about 700° C. since appreciable decomposition of the fluoroalkylthiirane with loss of sulfur and formation of the corresponding fluoroalkylethylene begins to take place in the neighborhood of 650° C. The pyrolysis is most conveniently conducted by passing vapors of the polyfluoroalkyl 1,1 - dioxo -1,3 - dithietane through a reaction zone held at the required temperature, for example a tube of heat-resistant glass or ceramic or of metal, such as platinum, nickel, stainless steel or Monel metal. The pyrolysis can be performed at atmospheric pressure, but better results are obtained by operating at reduced pressures, e.g., of the order of 0.1–100 mm. of mercury. The contact time in the hot reaction zone varies, depending on factors such as the operating pressure, but it is in general in the range of from 1 to 60 seconds. The gaseous reaction product emerging from the reaction zone is then condensed in cold traps and the condensate is distilled to effect separation of the fluoroalkylthiirane from the sulfur dioxide. Alternatively, the gaseous reaction product can be passed through traps held at such a temperature that the fluoroalkylthiirane alone is condensed while the sulfur dioxide escapes.

In process (B), the starting materials are the di(polyfluoroalkyl)thioketones of the formula

where $R^1$ and $R^2$ are perfluoroalkyl, ω-chloroperfluoroalkyl or ω-hydroperfluoroalkyl radicals, preferably of 1 to 6 carbon atoms. Methods for the preparation of these thioketones have already been indicated under (3) above. Examples of suitable thioketones are

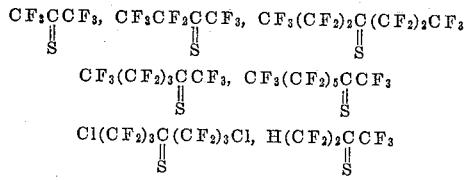

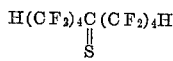

and $$H(CF_2)_4C(CF_2)_4H$$
$$\parallel$$
$$S$$

These polyfluoroalkylthioketones are reacted with diazo compounds of the type

where $R^3$ and $R^4$ have the previously defined significance. Thus, the diazo compound can be a diazohydrocarbon, examples of which are diazomethane, $N_2CH_2$; diazoethane, $N_2CHCH_3$; dimethyldiazomethane, $N_2C(CH_3)_2$; 1-diazopropane, $N_2CHC_2H_5$; 1-diazobutane, $$N_2CH(CH_2)_2CH_3$$

4-diazo-2-methylbutane, $N_2CHCH_2CH(CH_3)_2$; 1-diazoheptane, $N_2CH(CH_2)_5CH_3$; phenyldiazomethane, $$N_2CHC_6H_5$$

methylphenyldiazomethane, $N_2C(CH_3)(C_6H_5)$; diphenyldiazomethane, $N_2C(C_6H_5)_2$; di(p-tolyl)diazomethane, $N_2C(C_6H_4CH_3)_2$; di(p-butylphenyl)diazomethane, $$N_2C(C_6H_4C_4H_9)_2$$

and di-β-naphthyldiazomethane, $N_2C(C_{10}H_7)_2$. Preferably, any hydrocarbyl group present in the diazohydrocarbon has from 1 to 10 carbon atoms. Still more preferably, both $R^3$ and $R^4$ are aryl or alkaryl of 6 to 10 carbon atoms. The diazo compound can also be an α-diazoester, examples of which are: methyl diazoacetate, $N_2CHCOOCH_3$; ethyl diazoacetate, $N_2CHCOOC_2H_5$; isoamyl diazoacetate, $N_2CHCOOCH_2CH_2CH(CH_3)_2$; n-hexyl diazoacetate, $N_2CHCOOC_6H_{13}$; ethyl α-diazopropionate, $N_2C(CH_3)COOC_2H_5$; methyl α-diazobutyrate, $$N_2C(C_2H_5)COOCH_3$$

ethyl α-diazoisocaproate, $$N_2C[CH_2CH(CH_3)_2]COOC_2H_5$$

ethyl α-diazooctanoate, $N_2C[CH_2(CH_2)_4CH_3]COOC_2H_5$; methyl α-diazophenylacetate, $N_2C(C_6H_5)COOCH_3$; and ethyl α-diazo-(β-naphthylacetate), $$N_2C(C_{10}H_7)COOC_2H_5$$

The preferred diazoesters are those of the formula

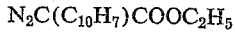

where $R^3$ is hydrogen or hydrocarbyl of 1 to 10 carbon atoms and $R^4$ is an alkoxycarbonyl group —$COOR^5$, where $R^5$ is alkyl of 1 to 6 carbon atoms.

The reaction between the polyfluoroalkylthioketone and the diazo compound is conducted simply by bringing the two reactants in contact, preferably but not necessarily in approximately equimolar amounts. The reaction is vigorous and exothermic. For this reason, it is generally carried out at an external temperature between about −100 and +20° C. and which is preferably in the range from −80 to 0° C. A solvent for the reactants can be used if desired to moderate the vigor of the reaction. Suitable solvents are, for example, the aliphatic and aromatic hydrocarbons, the acyclic or cyclic ethers, etc. The reaction is most conveniently carried out at atmospheric pressure, allowing the nitrogen that forms to escape, but closed vessels can be used if desired. The reaction is rapid and gives good yields of the resulting polyfluoroalkylthiirane, which can be isolated and, if necessary, purified by conventional procedures.

The following examples illustrate the invention in greater detail.

EXAMPLE I 1,1 - dioxo - 2,2,4,4-tetrakis(trifluoromethyl)-1,3-dithietane was sublimed at 1 mm. pressure and at the rate of 20 g. per hour through a platinum tube 0.5 inch in diameter and 25 inches long, heated to 550° C. over a length of 12 inches. The effluent gases were condensed in a trap cooled by liquid nitrogen. The condensate was then distilled through a packed column. From 99 g. of starting material was obtained 15.2 g. of sulfur dioxide, B.P. −11 to −9° C. and further identified by infrared spectroscopy, and 79.1 g. of 2,2,3,3-tetrakis(trifluoromethyl)thiirane

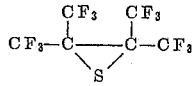

as a colorless liquid, B.P. 91° C., $n_D^{25}$ 1.3164.

*Analysis.*—Calcd. for $C_6F_{12}S$: C, 21.70; F, 68.65; S, 9.65. Found: C, 21.89; F, 68.54; S. 9.65.

When the pyrolysis was carried out at 650° C. instead of 550° C., an equimolar mixture of the thiirane and of tetrakis(trifluoromethyl)ethylene was obtained.

The 1,1 - dioxo-2,2,4,4-tetrakis(trifluoromethyl)-1,3-dithietane used as the starting material in this example may be prepared as follows:

(A) *Perfluoropropanethione*

In a platinum tube heated at 432–625° C. was introduced a mixture of hexafluoropropene (84 g.) and molten sulfur (26 ml.) over a period of 1.5 hours. The volatile reaction product was condensed in a trap at −80° C. Distillation of this condensate from the trap at 1 mm. pressure gave the deep blue perfluoropropanethione,

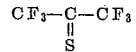

(B) *2,2,4,4-Tetrakis(Trifluoromethyl)-1,3-Diethietane*

Perfluoropropanethione, 2.4 ml., was placed in a flask and cooled to −80° C. A solution of 3 drops of N,N-dimethylformamide in 5 ml. of diethyl ether was added. The blue color of the perfluoropropanethione faded instantly and a white crystalline precipitate formed in a few minutes. The mixture was allowed to warm to room temperature and then distilled. There was obtained 2.1 g. of 2,2,4,4-tetrakis(trifluoromethyl)-1,3-dithietane,

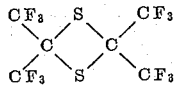

as a clorless liquid boiling at 109–111° C.

(C) *1,1-Dioxo-2,2,4,4-Tetrakis(Trifluoromethyl)-1,3-Dithietane*

A mixture of 91 g. of 2,2,4,4-tetrakis(trifluoromethyl)-1,3-dithietane, 150 ml. of yellow fuming nitric acid and 60 g. of chromium trioxide was heated at reflux (about 70° C.) for 15 hours. The reaction mixture was then poured over 250 g. of crushed ice, and the solid that separated was collected on a filter under nitrogen pressure, washed with water and recrystallized from methanol. After drying, there was obtained 80.1 g. of 1,1-dioxo-2,2,4,4-tetrakis(trifluoromethyl)-1,3-dithietane,

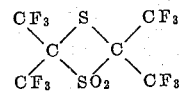

as large colorless prisms, M.P. 35° C., $n_D^{40}$ 1.3438.

*Analysis.*—Calc'd for $C_6F_{12}O_2S_2$: C, 18.19; F, 57.54; S, 16.11. Found: C, 17.91; F, 57.82; S, 16.38.

EXAMPLE II

Using the apparatus and conditions of Example I, except that the pyrolysis temperature was 525° C., 40 g. of 1,1-dioxo-2,4-bis(chlorodifluoromethyl)-2,4-difluoro-1,3-dithietane was pyrolyzed over a period of 2 hours. The condensate in the cold trap was then distilled under reduced pressure to give 27.85 g. of 2,3-bis(chlorodifluoromethyl)-2,3-diffuorothiirane,

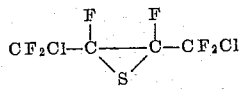

as a colorless liquid, B.P. 46–47° C. at 80 mm. pressure, $n_D^{24}$ 1.3828.

*Analysis.*—Calc'd for $C_4Cl_2F_6S$: C, 18.13; Cl, 26.76; F, 43.02; S, 12.09. Found: C, 18.31; Cl, 26.61; F, 43.17; S, 12.37.

The nuclear magnetic resonance fluorine spectrum indicated that the product was a mixture of the cis and trans isomers in approximately equal amounts.

The 1,1-dioxo-2,4 - bis(chlorodifluoromethyl) - 2,4 - difluoro-1,3-dithietane used as the starting material in this example may be prepared as follows:

(A) *2,4-Bis(Chlorodifluoromethyl)-2,4-Difluoro-1,3-Dithietane*

A solution of 38 g. of chlorodifluorothioacetyl fluoride [prepared according to J. Gen. Chem. U.S.S.R.—Eng. Tr. 27, 2301, (1957)] in 25 ml. of dichlorodifluoromethane in a quartz reaction vessel was irradiated at reflux temperature with ultraviolet light for 3 hours. The dichlorodifluoromethane was evaporated and the residue was distilled under reduced pressure. There was obtained 31.3 g. of 2,4-bis(chlorodifluoromethyl)-2,4-difluoro-1,3-dithietane as a colorless oil, B.P. 44° C. at 23 mm. pressure, $n_D^{24}$ 1.4131.

(B) *1,1-Dioxo-2,4-Bis(Chlorodifluoromethyl)2,4-Difluoro-1,3-Dithietane*

A mixture of 118.8 g. of 2,4-bis(chlorodifluoromethyl)-2,4-difluoro-1,3-dithietane (cis and trans isomers), 96 g. of chromium trioxide and 240 ml. of yellow fuming nitric acid was stirred and heated to reflux (about 70° C.) for 18 hours. The reaction mixture was cooled and filtered and the filtrate was poured over 500 g. of crushed ice. The lower organic layer was separated, washed with water, dried over calcium chloride and distilled under reduced pressure. There was obtained 99.4 g. of 1,1-dioxo-2,4-bis(chlorodifluoromethyl)-2,4-difluoro-1,3-dithietane,

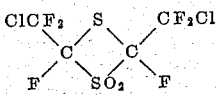

as a colorless liquid, B.P. 50.5° C. at 8 mm. pressure, $n_D^{24.5}$ 1.4169. The fluorine nuclear magnetic resonance spectrum indicated this product to be a mixture of the cis and trans isomers in approximately equal amounts.

*Analysis.*—Calc'd for $C_4Cl_2F_6O_2S_2$: C, 14.60; Cl, 21.55; F, 34.64; S, 19.50. Found: C, 14.84; Cl, 21.49; F, 34.54; S, 19.52.

EXAMPLE III

Using the apparatus and conditions of Example I, except that the reaction temperature was 530° C. and the pressure within the tube 2 m., 25 g. of 1,1-dioxo-2,4-bis-(trifluoromethyl)-2,4-difluoro-1,3-dithietane was pyrolyzed over a period of one hour. Distillation of the condensed reaction product gave sulfur doxide and 11.5 g. of 2,3-bis(trifluoromethyl)-2,3-difluorothiirane,

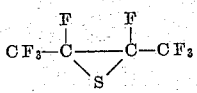

as a liquid boiling at 35–36° C., $n_D^{25}$ 1.297.

*Analysis.*—Calc'd for $C_4F_8S$: C, 20.7; F, 65.6; S, 13.7. Found: C, 22.1; F, 65.7; S, 13.4.

Gas chromatographic analysis showed this product to be a 50:50 mixture of the cis and trans isomers.

The 1,1-dioxo-2,4-bis(trifluoromethyl)-2,4-difluoro-1,3-diethietane used as the starting material in this example may be prepared as follows:

(A) *2,4-Bis(Trifluoromethyl)-2,4-Difluoro-1,3-Dithietane*

A quartz reaction vessel equipped with a condenser cooled with solid carbon dioxide was swept with nitrogen and charged with 25 ml. (as liquid) of dichlorodifluoromethane and 15 g. of trifluorothioacetyl fluoride. The vessel was irradiated with a mercury resonance lamp for 3 hours, after which the yellow color of the trifluorothioacetyl fluoride had disappeared. The volatile materials were allowed to escape at room temperature, leaving 11.5 g. of a light yellow liquid which, on fractional distillation, yielded 9 g. of 2,4-bis(trifluoromethyl)2,4-difluoro-1,3-dithietane, B.P. 69° C., $n_D^{25}$ 1.3378.

*Analysis.*—Calc'd for $C_4F_8S_2$: C, 18.2; F, 57.6. Found: C, 18.3; F, 57.6.

(B) *1,1-Dioxo-2,4-Bis(Trifluoromethyl)-2,4-Difluoro-1,3-Dithietane*

A mixture of 60 g. (0.23 mole) of 2,4-bis(trifluoromethyl)-2,4-difluoro-1,3-dithietane, 113 g. (1.13 moles) of chromium trioxide and 150 ml. of yellow fuming nitric acid was refluxed for 4 hours and then poured onto a mixture of water and ice. The resulting mixture was extracted twice with 100-ml. portions of methylene chloride, the organic extracts were dried over sodium sulfate and distilled to give 38.5 g. of 1,1-dioxo-2,4-bis(trifluoromethyl)-2,4-difluoro-1,3-dithietane,

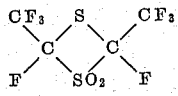

B.P. 106° C., $n_D^{25}$ 1.3540.

*Analysis.*—Calc'd for $C_4F_8O_2S_2$: C, 16.2; F, 51.4; S, 21.7. Found: C, 16.8; F, 51.7; S, 21.1.

EXAMPLE IV

A solution of 22.8 g. of ethyl diazoacetate in 40 ml. of pentane was cooled to −78° C. Perfluoropropanethione was added dropwise to the stirred solution over a period of 5 minutes until a faint blue color persisted. The reaction mixture was filtered while still cold and the white solid that was collected on the filter was washed with cold pentane and recrystallized from diethyl ether. There was obtained 10.3 g. of 2,2-bis-(trifluoromethyl)-3-(ethoxycarbonyl)thiirane,

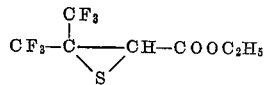

as white needles, M.P. 84–86° C. An analytical sample was prepared by recrystallizing again from ether to give white needles, M.P. 87–89° C.

*Analysis.*—Calc'd for $C_7H_6F_2O_2S$: C, 31.38; H, 2.26; F, 42.51; S, 11.95. Found: C, 31.52; H, 2.02; F, 42.25; S, 12.10.

EXAMPLE V

Diphenyldiazomethane was prepared in solution as follows: A mixture of 19.6 g. (0.1 mole) of benzophenone hydrazone, 22 g. (0.1 mole) of yellow mercuric oxide, and 100 ml. of pentane was stirred for 6 hours at room temperature. Magnesium sulfate, 20 g., was added and the suspension was stirred for an additional 20 minutes and then filtered. The solids were washed with 25 ml. of pentane and this wash was combined with the filtrate. The bright purple filtrate was then transferred to a flask and cooled to −78° C. To this solution, containing diphenyldiazomethane, was added dropwise with vigorous stirring 18.2 g. (0.1 mole) of perfluoropropanethione and strong external cooling was maintained during the entire time of the addition. A vigorous evolution of gas occured and a solid began to separate after about one-third of the perfluoropropanethione had been added. When the addition was completed, the reaction mixture was allowed to warm to room temperature and the solvent was evaporated under reduced pressure. There was obtained 35 g. of slightly damp crystalline residue, which was recrystallized from pentane to give 22 g. of 2,2-bis(trifluoromethyl)-3,3-diphenylthiirane,

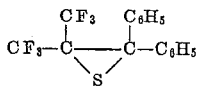

as white needles, M.P. 79–80° C. A second crop of 5 g. of crystals was also obtained from the filtrate of these recrystallizations.

*Analysis.*—Calc'd for $C_{16}H_{10}F_6S$: C, 55.17; H, 2.90; F, 32.73; S, 9.20; M.W., 348.3. Found: C, 54.37; H, 2.95; F, 32.71; S, 9.29; M.W., 354.

While the invention has been illustrated in the foregoing detailed examples with reference to certain specific product, it is generic to the fluoroalkylthiirane represented by Formula I shown and explained earlier. These compounds can be more specifically divided into the following three groups:

(I–*a*) The compounds of the formula

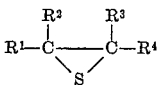

where $R^1$ and $R^4$ are polyfluoroalkyl radicals (perfluoroalkyl, ω-chloroperfluoroalkyl and ω-hydroperfluoroalkyl), preferably of 1 to 6 carbon atoms, and $R^2$ and $R^3$ are both polyfluoroalkyl radicals as defined, preferably of 1 to 6 carbon atoms, fluorine or chlorine. Additional examples of such compounds, which can be prepared by the process of Examples I–III, include 2,3-bis(perfluoroethyl)-2,3-dichlorothiirane; 2,3-bis(ω-chloroperfluorobutyl)-2,3-dichlorothiirane; 2,3-bis(ω-hydroperfluorohexyl)-2,3-dichlorothiirane; 2,3-bis(perfluoropropyl)-2,3-difluorothiirane; 2,3-bis(ω-chloroperfluoropropyl)-2,3-difluorothiirane; 2,3-bis(ω-hydroperfluorobutyl)-2,3-difluorothiirane; 2,2,3,3-tetrakis(perfluorobutyl)thiirane; 2,3-bis(perfluorobutyl)-2,3-bis(trifluoromethyl)thiirane; 2,3-bis(ω-chloroperfluoroethyl)-2,3-bis(trifluoromethyl)thiirane; and the like.

(I–*b*) The compounds of the formula

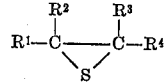

where $R^1$ and $R^2$ are polyfluoroalkyl radicals (perfluoroalkyl, ω-chloroperfluoroalkyl and ω-hydroperfluoroalkyl), preferably of 1 to 6 carbon atoms, $R^3$ is hydrogen or a hydrocarbyl radical (alkyl, aryl, alkaryl), preferably of 1 to 10 carbon atoms; and $R^4$ is an alkoxycarbonyl radical, i.e., $-COOR^5$, where $R^5$ is alkyl, preferably of 1 to 6 carbon atoms. Additional examples of such compounds, which can be prepared by the process of Example IV, include 2,2-bis(perfluoroethyl)-3-(hexyloxycarbonyl)thiirane; 2,2-bis(perfluorohexyl)-3-methyl-3-(ethoxycarbonyl)thiirane; 2,2-bis(ω-chloroperfluoropropyl)-3-ethyl-3-(methoxycarbonyl)thiirane; 2,2-bis(chlorodifluoromethyl)-3-hexyl-3-(ethoxycarbonyl)thiirane; 2,2-bis(ω-hydroperfluorobutyl)-3-(methoxycarbonyl)thiirane; 2-trifluoromethyl-2-perfluoroethyl-3-phenyl-3-(methoxycarbonyl)thiirane; 2,2-bis(ω-hydroperfluoroethyl)-3-naphthyl-3-(ethoxycarbonyl)thiirane; and the like.

(I–*c*) The compounds of the formula

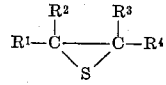

where $R^1$ and $R^2$ are polyfluoroalkyl radicals (perfluoroalkyl, ω-chloroperfluoroalkyl, ω-hydroperfluoroalkyl), preferably of 1 to 6 carbon atoms, and $R^3$ and $R^4$ are hydrogen or hydrocarbyl radicals (alkyl, aryl, alkaryl), preferably of 1 to 10 carbon atoms. Still more preferably, both $R^3$ and $R^4$ are aryl or alkaryl radicals of 6 to 10 carbon atoms. Additional examples of such compounds, which can be prepared by the process of Example V, include 2,2-bis(trifluoromethyl)-3-methylthiirane; 2-trifluoromethyl-2-(ω-chloroperfluoroethyl)-3,3-dimethylthiirane; 2,2-bis(trifluoromethyl)-3-propylthiirane; 2,2-bis(perfluorohexyl)-3-phenylthiirane; 2,2-bis(ω-chloroperfluorobutyl)-3-methyl-3-phenylthiirane; 2-trifluoromethyl-2-(ω-hydroperfluoroethyl)-3,3-bis(p-tolyl)thiirane; 2,2-bis(trifluoromethyl)-3,3-bis(p-butylphenyl)thiirane; 2,2-bis(ω-hydroperfluorobutyl)-3,3-bis(α-naphthyl)thiirane; and the like.

The fluoroalkylthiiranes of this invention are generically useful as solvents or plasticizers for highly halogenated polymers. With those thiiranes which are liquids at or near ordinary temperature, the solutions so obtained can be used to impregnate porous materials such as textiles, paper, wood, brick, etc., thereby obtaining waterproofing effects, and to apply protective coatings on non-porous materials such as metals. For example, solutions containing about 5% by weight of low molecular weight polytetrafluoroethylene (M.P. 83–105° C.) in 2,2,3,3-tetrakis (trifluoromethyl)thiirane and in 2,3-bis(chlorodifluoromethyl)-2,3-difluorothiirane were prepared by stirring mixtures of the polymer and the solvent at room temperature. When the homogeneous solutions were coated on filter paper, the water repellency of the treated paper was considerably improved in comparison with untreated controls. Fluoroalkylthiiranes which are normally solid are also excellent solvents at or above their melting points for polyhalogenated polymers. For example, 2,2-bis(trifluoromethyl)-3,3-diphenylthiirane dissolved readily the same polytetrafluoroethylene at 80° C. Thus, there can be obtained plasticized polymer compositions useful for making tight seals on threaded joints, valves, couplings, fittings and similar metallic parts.

The liquid thiiranes are further suitable for use in low or moderate temperature thermometers. Thus, 2,2,3,3-tetrakis(trifluoromethyl)thiirane in a sealed glass capillary tube was found to be superior to alcohol as a temperature indicator because of its higher coefficient of expansion, and superior to mercury in that it can be used at lower temperatures.

The foregoing detailed discription has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

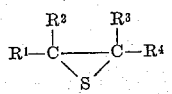

wherein from 2 to 4 of the R groups are polyfluoroalkyl radicals of from 1 to 6 carbon atoms and selected from the class consisting of perfluoroalkyl, ω-chloroperfluoroalkyl and ω-hydroperfluoroalkyl, and any remaining R groups are selected from the class consisting of hydrogen, fluorine, chlorine, monovalent hydrocarbyl radicals selected from the class consisting of alkyl of 1 to 6 carbon atoms and aryl and alkaryl of 6 to 10 carbon atoms, and monovalent alkoxycarbonyl radicals in which the alkoxy groups have from 1 to 6 carbon atoms; with the provisos that (1) when $R^1$ and $R^4$ are polyfluoroalkyl radicals as defined above, $R^2$ and $R^3$ are both members of one of the three groups selected from the class consisting of (a) polyfluoroalkyl radicals as defined above, (b) fluorine and (c) chlorine; and (2) when $R^1$ and $R^2$ are polyfluoroalkyl radicals as defined above, $R^3$ and $R^4$ are members of the class consisting of polyfluoroalkyl radicals as defined above, hydrogen, hydrocarbyl radicals as defined above, and alkoxycarbonyl radicals as defined above, not more than one of $R^3$ and $R^4$ being alkoxycarbonyl.

2. A compound of the formula

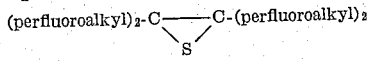

wherein said perfluoroalkyl radicals have from 1 to 6 carbon atoms.

3. A compound of the formula

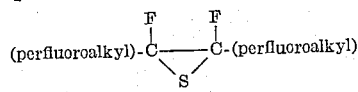

wherein said perfluoroalkyl radicals have from 1 to 6 carbon atoms.

4. A compound of the formula

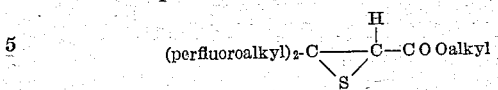

wherein said perfluoroalkyl radicals have from 1 to 6 carbon atoms; and said alkyl radical has from 1 to 6 carbon atoms.

5. A compound of the formula

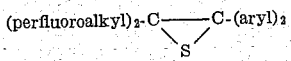

wherein said perfluoroalkyl radicals have from 1 to 6 carbon atoms, and said aryl radicals have from 6 to 10 carbon atoms.

6. 2,2,3,3-tetrakis(trifluoromethyl)thiirane.
7. 2,3-bis(chlorodifluoromethyl)-2,3-difluorothiirane.
8. 2,3-bis(trifluoromethyl)-2,3-difluorothiirane.
9. 2,2-bis(trifluoromethyl)-3-(ethoxycarbonyl)thiirane.
10. 2,2-bis(trifluoromethyl)-3,3-diphenylthiirane.
11. Process which comprises heating at a temperature of at least 300° C. a 1,1-dioxo-1,3-dithietane of the formula

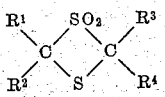

wherein $R^1$ and $R^4$ are polyfluoroalkyl radicals of from 1 to 6 carbon atoms and selected from the class consisting of perfluoroalkyl, ω-chloroperfluoroalkyl and ω-hydroperfluoroalkyl radicals, and $R^2$ and $R^3$ are both members of one of the groups selected from the class consisting of polyfluoroalkyl radicals as defined above, fluorine and chlorine, whereupon sulfur dioxide is liberated and a fluoroalkylthiirane is obtained.

12. The process of claim 11 in which vapors of said 1,1-dioxo-1,3-dithietane are passed through a reaction zone held at a temperature between about 300° and 700° C.

13. The process of claim 11 in which the pyrolysis is effected at a pressure of from 0.1 to 100 mm. of mercury.

References Cited in the file of this patent
UNITED STATES PATENTS
2,724,719    Markley et al. _____ Nov. 22, 1955